Nov. 30, 1926.
C. L. KENNEDY
FISHING ROD SUPPORT
Filed August 14, 1925
1,608,795
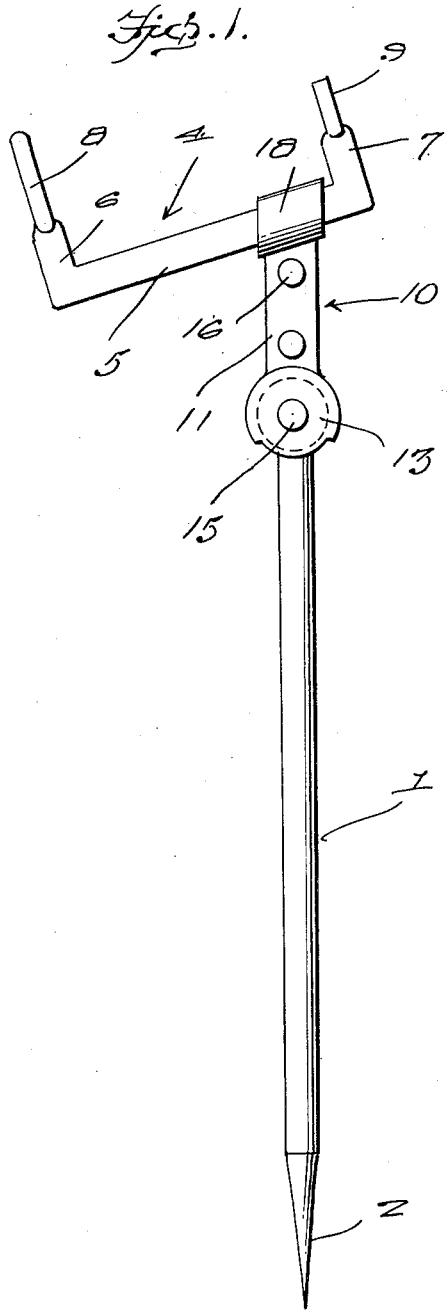
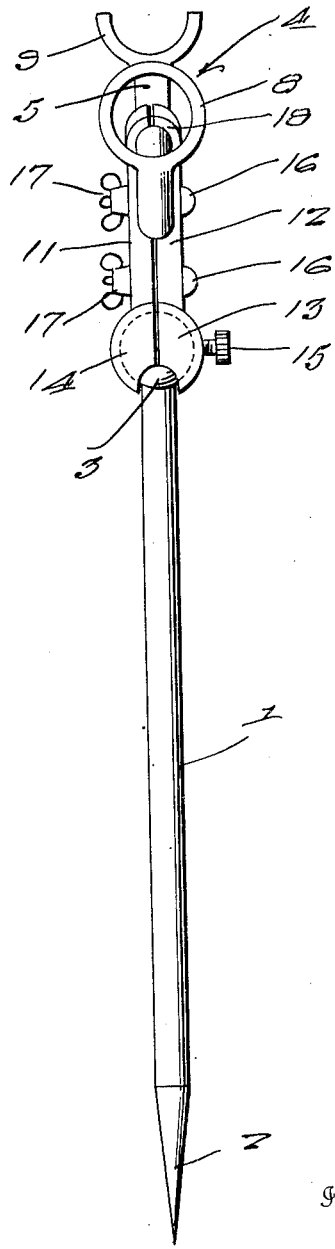
Inventor
C. L. Kennedy
By Clarence A. O'Brien
Attorney Patented Nov. 30, 1926.

1,608,795

UNITED STATES PATENT OFFICE.

CHARLES L. KENNEDY, OF COLORADO SPRINGS, COLORADO.

FISHING-ROD SUPPORT.

Application filed August 14, 1925. Serial No. 50,301.

This invention relates to an improved support which is especially, but not necessarily, designed for supporting a fishing rod in an inclined position, or in fact, in any desirable position.

The principal object is to generally improve upon devices of this class by providing one of comparative simplicity and durability, but which is practical in construction, easy to adjust, and one which is made up of a plurality of separable parts enabling said parts to be disassembled and arranged in a compact package to be placed in a comparatively small carrier for other fishing tools and appliances.

Other features and advantages of the invention will become apparent from the following description and drawings.

In the accompanying drawings forming a part of this application and in which like numerals are employed to designate like parts throughout the same:—

Figure 1 is a side view of a device constructed in accordance with the present invention showing the fishing rod holder adjusted to one position.

Fig. 2 is an end elevation of the same, looking in a direction from left to right.

Referring to the drawings in detail, the reference character 1 designates an anchor which is pointed at its lower end as at 2 to permit it to be driven into the ground, boards or the like. On its top this anchor is provided with a spherical ball 3. This ball is adapted to have universal connection with a fishing rod holder represented generally by the reference character 4.

This holder preferably comprises a cylindrical part 5 having upwardly directed end portions 6 and 7, the first named of which is provided with a ring 8 and the second named of which is provided with a U-shaped seat 9.

A clamp 10 comprises a means for universally connecting the holder 4 with the ball 3. The clamp comprises a pair of duplicate half sections 11 and 12 provided with semi-spherical portions 13 and 14, which form a socket for reception of the ball 3. The portion 14 with a set screw 15 serves to hold the parts in various adjusted positions. It will be noted from Fig. 2 more particularly, that the socket formed by the parts 13 and 14 is constructed at its bottom so that very little side movement of the holder and clamp is permitted and restricting the movement more particularly to a vertical swing. Bolts 16 pass through the sections of the clamp and are provided with thumb nuts 17 for holding the two sections together.

The upper ends of the sections are provided with semi-circular jaws 18 frictionally gripping the cylindrical member 5. The jaws are disposed diagonally with respect to the longitudinal axis of the clamp proper and they are so proportioned that they have a sliding grip with the cylindrical member 5. In this way, the holder 4 may be slid therethrough and held affixed in any set position.

In practice the stake 1 is driven into an appropriate support and the holder 4 is adjusted to the proper angular position, after which the fishing rod is placed in position in the ring 8 and seat 9. When the device is not in use, the sections of the clamp are separated to permit detachment of the holder 4 and the clamp from the stake 1. Then all of the parts may be arranged in a compact condition to permit them to be stored in a comparatively small space in a stock or other carrier utilized for this purpose by the fisherman, for carrying the other fishing tools and implements.

No doubt, a careful consideration of the description in connection with the drawings will enable persons skilled in the art to which the invention relates to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. A fishing rod support comprising a vertical supporting standard, a spherical head on the upper end thereof, a substantially U-shaped holder embodying vertically disposed means for supporting the fishing rod, and a connector between said holder and said standard, said connector being provided at its lower end with a socket for the reception of the spherical head on the upper end of the standard, and means associated with the upper end of the connector for slidably and frictionally engaging the intermediate portion of said holder.

2. A fishing rod support comprising a vertical supporting standard, a spherical head on the upper end of said standard, a substantially U-shaped holder embodying vertically disposed means for supporting the fishing rod, a clamp for securing the holder to said standard, said clamp comprising a pair of complementary half sections, the lower ends thereof being semi-circular to provide a socket for receiving said spherical head whereby said clamp is adjustably associated with the upper end of the standard, and substantially semi-circular jaws formed on the upper ends of the complementary sections of the clamp adapted for slidably and frictionally engaging the intermediate portion of the said U-shaped holder, and means for securing the sections together.

In testimony whereof I affix my signature.

CHARLES L. KENNEDY.